US009043056B2

(12) United States Patent
Nemeth et al.

(10) Patent No.: US 9,043,056 B2
(45) Date of Patent: May 26, 2015

(54) METHOD AND SYSTEM FOR USING DYNAMIC BOUNDARIES TO MANAGE THE PROGRESSION OF RIDE VEHICLES THAT HAVE RIDER CONTROL INPUTS

(71) Applicant: DISNEY ENTERPRISES, INC., Burbank, CA (US)

(72) Inventors: Edward A. Nemeth, Hermosa Beach, CA (US); Paul E. Baker, Porter Ranch, CA (US); Robert Scott Trowbridge, La Canada, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 189 days.

(21) Appl. No.: 13/936,694

(22) Filed: Jul. 8, 2013

(65) Prior Publication Data

US 2015/0012157 A1 Jan. 8, 2015

(51) Int. Cl.
*B61B 13/00* (2006.01)
(52) U.S. Cl.
CPC ...................................... *B61B 13/00* (2013.01)
(58) Field of Classification Search
None
See application file for complete search history.

(56) References Cited

U.S. PATENT DOCUMENTS

| 5,278,554 | A * | 1/1994 | Marton | 340/910 |
| 5,921,701 | A * | 7/1999 | Clayton | 404/1 |
| 6,094,616 | A * | 7/2000 | Andreas et al. | 701/96 |
| 7,092,815 | B2 * | 8/2006 | Dort | 701/117 |
| 8,849,494 | B1 * | 9/2014 | Herbach et al. | 701/24 |
| 2008/0094250 | A1 * | 4/2008 | Myr | 340/909 |
| 2010/0134320 | A1 * | 6/2010 | Chevion et al. | 340/932 |
| 2010/0256852 | A1 * | 10/2010 | Mudalige | 701/24 |
| 2013/0138276 | A1 * | 5/2013 | Soderi et al. | 701/19 |
| 2014/0012438 | A1 * | 1/2014 | Shoppa et al. | 701/19 |
| 2014/0142792 | A1 * | 5/2014 | Hanaka et al. | 701/19 |
| 2014/0358338 | A1 * | 12/2014 | Harasaki | 701/19 |

* cited by examiner

*Primary Examiner* — John R Olszewski
*Assistant Examiner* — Nicholas K Wiltey
(74) *Attorney, Agent, or Firm* — Marsh Fischmann & Breyfogle LLP; Kent A. Lembke

(57) ABSTRACT

A method for controlling vehicle progression along a ride path of an amusement park ride. The method includes receiving inputs from a passenger of a vehicle on the ride path and processing the received inputs to determine a vehicle state change. The method includes determining a present or predicted vehicle state and comparing the present or predicted vehicle state with constraints defined by a dynamic boundary associated with the vehicle. The method includes issuing vehicle control commands to a drive assembly to implement the vehicle state change if it complies with the constraints. The dynamic boundary is moved logically along the ride path at a nominal speed to define a set of boundaries for movement of the vehicle along the ride path. The vehicle state change may be a change that causes the vehicle to travel at a speed differing from the dynamic boundary while remaining within the dynamic boundary.

19 Claims, 10 Drawing Sheets

DYNAMIC BOUNDARIES SPLITTING AND MERGING AROUND BRANCHING ELEMENTS

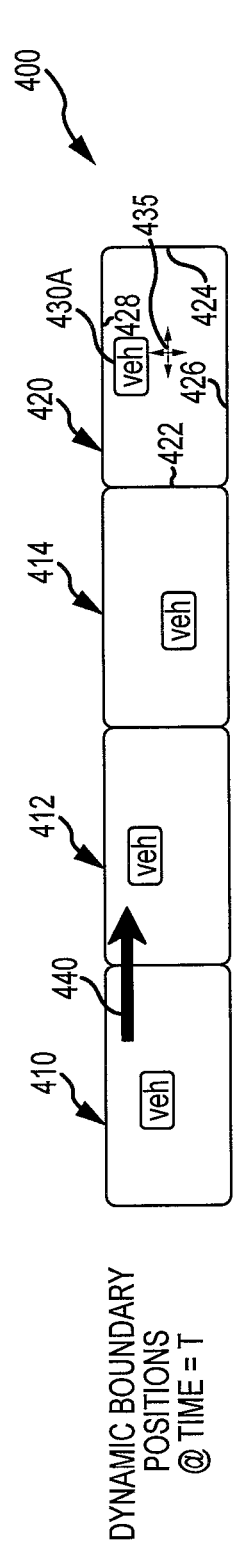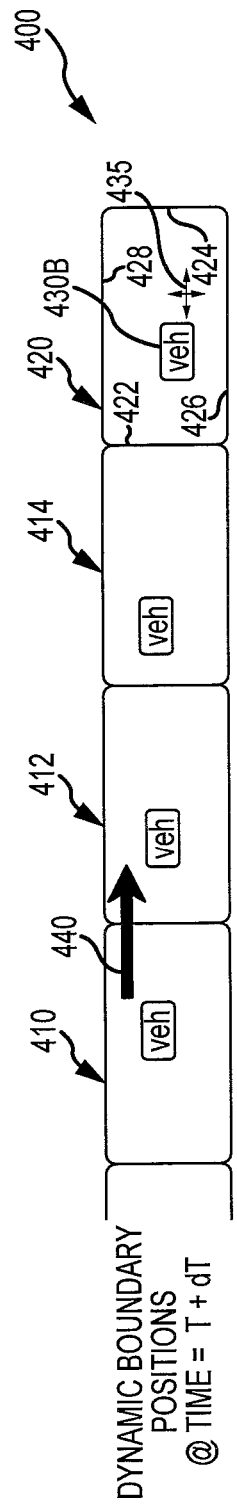

DYNAMIC BOUNDARIES SPLITTING AND MERGING AROUND BRANCHING ELEMENTS

DYNAMIC BOUNDARIES CONSTRAINING VEHICLES TO PRECISE PLANNED MOVEMENTS

DYNAMIC BOUNDARIES MOVING THROUGH A RESTRICTION (SUCH AS A DOOR)

METHOD AND SYSTEM FOR USING DYNAMIC BOUNDARIES TO MANAGE THE PROGRESSION OF RIDE VEHICLES THAT HAVE RIDER CONTROL INPUTS

BACKGROUND

1. Field of the Description

The present invention relates, in general, to methods and systems for controlling or managing the overall progression of passenger vehicles through an amusement park ride, and, more particularly, to methods and systems that use dynamic boundaries to define allowable rider inputs that modify vehicle speed and, in some cases, direction of movement along the intended ride path.

2. Relevant Background

Amusement park rides or simply "rides" have been around for more than a century and have been used to entertain millions of visitors to amusement parks, theme parks, carnivals, and fairs, typically by moving one or more riders in each vehicle along a track. For example, roller coasters move passengers rapidly along a track while some theme rides may include slow or show portions as well as fast or thrill portions. Park operators are continually searching for new ride designs to enhance the passenger's experience and to encourage repeated use of a ride, i.e., looking for something that makes the ride different or unique enough each time that a park visitor will take a ride many times.

Many rides allow the passenger or rider some control of their vehicle along the ride path. Many rides exist where the passenger vehicle is configured to allow a rider to provide input to rotate their vehicle to face any direction. However, the rider has no control over speed or the vehicle path as the vehicles are, for example, connected to a chain pulled along a track to move the vehicles along a ride path. In other words, no mechanism is provided for the rider to influence the movement of the vehicle along the ride path.

In other rides, the passenger can more fully control the vehicle's speed and direction along the ride path or track, e.g., go kart-type or bumper car-type rides. However, there is no mechanism for the ride operator to manage the vehicle spacing to ensure either throughput or show spacing. As a result, these rides do not meet the park operator's demands for rides with high and known throughput and for rides designed to place vehicles proximate to show elements at predefined show times such as when animatronics or display systems are operated to entertain passing passengers in the vehicles. In contrast to these rider-controlled rides, typical amusement park rides move passenger vehicles through a show space at programmed speeds and with programmed vehicle spacing. The speeds are used to provide a desired throughput and also to provide a desired show experience for the passengers, and the spacing is used to ensure passenger safety by avoiding collisions and also to provide a desired show experience (e.g., some level of individual experience for each vehicle in portions of the ride).

SUMMARY

There is a need and desire for rides that are designed and operated to provide a degree of passenger or rider control over their vehicle that allows the riders to affect their individual ride experience. With this in mind, a ride (and method of controlling or operating such a ride) is taught that manages vehicle progression along a ride path or along a path defined by a track to provide known vehicle throughputs, safe spacing of vehicles, and also provides control within certain portions of the ride path such as in the load/unload station and in show spaces.

Further, though, the ride is adapted to use dynamic boundaries or envelopes for each vehicle within which the vehicle's rider may provide input to affect their ride experience by controlling movement within the dynamic boundary or envelope. Briefly, the ride includes a controller that controls movement and location of each vehicle such that it remains within a dynamic boundary, and the controller moves the dynamic boundary (which defines gross movement of the vehicle) along the ride path in the direction of travel for the ride.

The dynamic boundary is configurable in some embodiments in that it may change its size and/or shape along the ride path, e.g., the dynamic boundary may be 30 feet long in one section of the ride (with a 5 to 15 foot long vehicle, for example) and then shrink to only be the length of the vehicle plus a safety or vehicle spacing distance (to avoid collisions) in a show space or in the station. The rider may provide input to speed up their vehicle, and the controller may allow this acceleration within the dynamic boundary until the vehicle reaches (or approaches) the leading or front edge of the dynamic boundary. Alternatively, the rider may provide input to slow their vehicle down to a speed that is slower than the speed of the dynamic boundary movement, and this may be allowed by the controller until it is determined that the vehicle is at or near the trailing or rear edge of the dynamic boundary. At this point, the controller may override the rider input and force the vehicle to go at least the dynamic boundary speed to stay within the confines of the dynamic boundary.

The amusement park ride and its control system are adapted to allow riders/passengers of vehicles to provide input (such as through a rider input device/assembly such as foot pedals, a joystick, a touch pad or screen, or other user input) to control their vehicle to modify the progression of their vehicle along the ride path in a significant and interesting way (e.g., control speed and/or direction of travel and not just provide rotation/spinning). The ride is controlled with a controller or control system so that ride throughput can be guaranteed to meet a design capacity for the ride such as by monitoring movement of dynamic boundaries along the ride path and one or more vehicles within such dynamic boundaries.

Using dynamic boundaries, which can be dynamically modified in size and/or shape, can allow the controller to manage movement of the ride vehicles in show portions and in unload/load areas of the ride path (e.g., within a station) such as by reducing the boundaries of the dynamic boundary to approximately the size and shape of the vehicle (with some safety distance provided to avoid collision in some applications). The monitoring of movement of the dynamic boundaries provides the attraction designers the flexibility to allow rider control of the vehicles in some portions of the ride path while forcing the vehicles to arrive at a specific time and/or with specific spacing in other portions (such as show portions). The riders may control vehicle speed and position within the dynamic boundaries without compromising the overall operation of the ride. The dynamic boundary method of managing vehicle progress applies to nearly any ride with individual (not interconnected chains) vehicles that are allowed to move through a space such as dark rides, free ranging vehicles (FRVs), boat rides, and so on.

More particularly, a method is taught for controlling vehicle progression along a ride path of an amusement park ride. The method includes receiving inputs from input devices (e.g., a joystick, a brake, an accelerator, and so on) operable by a passenger of a vehicle on the ride path. The method also includes processing the received inputs to determine a vehicle state change and predicting a new vehicle state (e.g., from input from one or more sensors on the vehicle or along the ride path). Then, the method includes comparing the predicted vehicle state with a set of constraints defined by a dynamic boundary associated with the vehicle. Further, the method includes, based on the comparing step and the vehicle state change, issuing vehicle control commands to a drive assembly of the vehicle to implement the vehicle state change, whereby the vehicle complies with the set of constraints.

In some embodiments of the method, the dynamic boundary (e.g., a logical construct) moves (or is moved by a control program) along the ride path at a nominal speed during operating of the amusement park ride, and the dynamic boundary defines a set of boundaries for the vehicle. In such embodiments, the vehicle state change may be a change in the vehicle speed and the issuing of the vehicle control commands causes the vehicle to travel at a speed differing from the nominal speed of the dynamic boundary, but the speed of the vehicle may be governed to force the vehicle to remain within the set of boundaries (e.g., slow down when approaching the front edge of the dynamic boundary).

The set of boundaries may define a dynamic boundary length as measured between a leading end of the dynamic boundary and a trailing end of the dynamic boundary. Then, the length may be greater than a length of the vehicle at least for portions of the ride path. In some applications, the length of the dynamic boundary is modified from a first length in a first portion of the ride path to a second length greater than the first length during a second portion of the ride path (e.g., to facilitate safe path crossings or to provide more control in stations or in show sections of the ride path the dynamic boundaries may be shrunk to limit free movement of the vehicle).

Likewise, the set of boundaries may define a dynamic boundary width that may be varied along the ride path, such that an amount of transverse movement of the vehicle is controlled to direct the vehicle through openings in obstructions. Further, the dynamic boundary may be split at a first location along the ride path into first and second dynamic boundaries and then later merged into a single dynamic boundary at a second location along the ride path. In such cases, the vehicle state change is processed to select the first or second dynamic boundary for constraining progression of the vehicle along the ride path.

BRIEF DESCRIPTION OF THE DRAWINGS

FIGS. 4A and 4B shows a portion of a ride using dynamic boundaries to manage vehicle progression at a first time (or first operating state) and then at a later, second time (or operating state) to show progression of a chain (or train) of dynamic boundaries along a ride path with concurrent movement (X-Y directional movement in this example) of a vehicle within a dynamic boundary;

DETAILED DESCRIPTION

Figure 1:
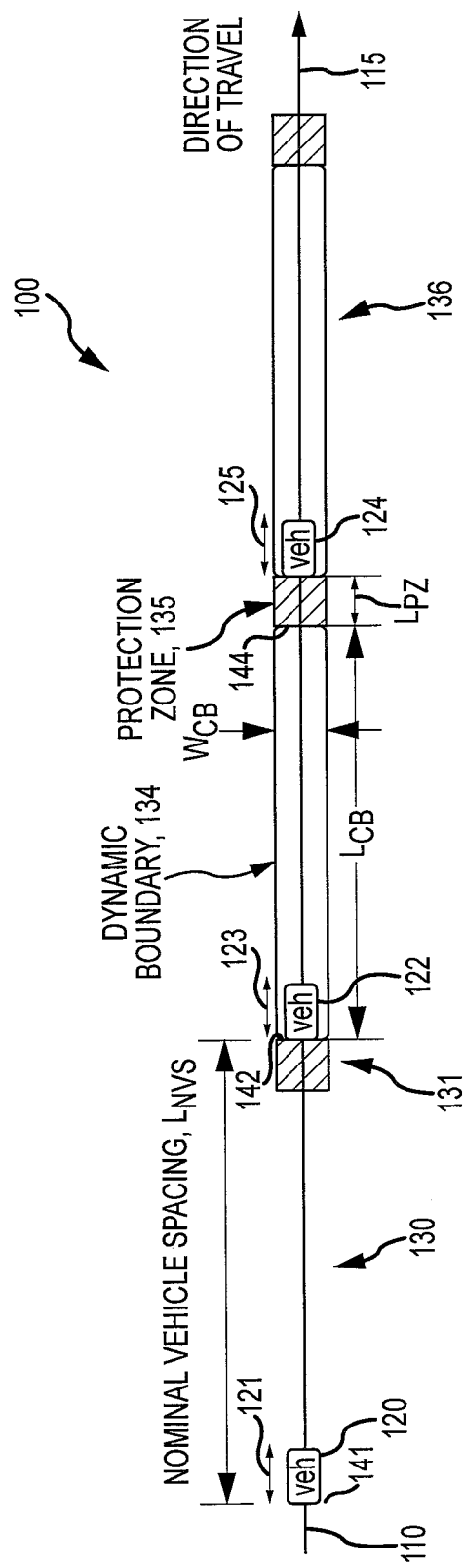
FIG. 1 is a schematic drawing of a ride or ride system operating to manage passenger vehicle progression along a direction of travel using dynamic boundaries.

The present description is directed toward methods and systems for managing progression of vehicles along a ride path (which may be associated with a track) for passenger vehicles configured for rider input to control at least speed of the vehicle. Briefly, the ride or ride system may be thought of as including a computer controlled vehicle (or a plurality of such vehicles) and a rider input device in the vehicle. A controller or control assembly is provided to achieve the computer-based control over the vehicle to manage progression of the vehicle along a ride path. The controller acts, such as by executing software in the form of a control program or module, to define a dynamic boundary for the vehicle, and the dynamic boundary (or control envelope) defines a moving range of allowable vehicle positions along the ride or planned path. In other words, the dynamic boundary may have a dynamic outer boundary (changes in size and/or shape along the ride path) moved over time along the ride path during operation of the ride, and the vehicle is controlled to remain within the boundaries (or inner space of the dynamic boundary) throughout the ride.

The controller further acts to respond to rider inputs from the input device to change the position of the vehicle within the allowable range of vehicle positions, e.g., to allow the vehicle to move at differing speeds than the dynamic boundary along the ride path, based on a present location or position of the vehicle within the dynamic boundary. The rider input may be ignored if the vehicle is already in a rear most position within the dynamic boundary and the rider inputs deceleration commands such that the controller forces the vehicle to move at the progression rate of the dynamic boundary along the ride path, whereby collision with a trailing vehicle in the next dynamic boundary is avoided. In another example, the rider may provide input to move the vehicle to or toward the front of the dynamic boundary, and the controller may allow such movement if the vehicle is not yet at the front or leading edge of the dynamic boundary (e.g., the vehicle travels faster than the rate of travel of the dynamic boundary along the ride path).

The inventors understood that typical spacing in rides between ride vehicles is much larger than the spacing needed to protect the vehicles against collisions. With this in mind, the rides described along with their controllers are designed to take advantage of this extra space by allowing riders (or the controller) to change vehicle speed and move the vehicle forward or back within an allowable range of positions as that range moves along the ride path, e.g., the dynamic boundary in which the vehicle is positioned and allowed to move travels along the ride path at a controller set rate (which may be constant or may be varied by the controller along the ride path).

By way of analogy, consider a subway train with one person locked in each car. The person may move about the car he is in but cannot leave the confines or space defined by the walls or boundaries of the car as the train and its cars move along a track. In this analogy, each car of the train represents a dynamic boundary while the person moving within the car represents a ride vehicle that can be operated or moved by a rider/passenger. The space between cars may represent a protection zone used to avoid collisions between the vehicles (e.g., 1 to 3 or more feet often is all that is used).

By moving the subway train along a track, it is guaranteed that a certain number of people will be moved from Point A to Point B along the track path within a specified time by setting the train (and, therefore, car) speed and on a schedule. Likewise, a "train" of dynamic boundaries may be moved along a ride path (which may be associated with a track guiding the vehicles) to cause several vehicles to move from a load portion of a station through a ride portion of the ride path and back to an unload portion of the station. As the train moves along the track, each person in each car can move freely within the car (forward and back, left and right, up and down) so that they sometimes move faster than the car and sometimes move slower than the car (and sometimes at the speed of the car). Likewise, a simple ride system may be configured such that a single vehicle is constrained to a single dynamic boundary, and a plurality or train of such dynamic boundaries is moved along a ride path associated with a track supporting the vehicles at a nominal (e.g., substantially constant) speed. The passengers or riders may be free to drive their vehicles left or right along the width of the track/path and to change speeds. However, the dynamic boundary is used to define the range of travel with its boundaries, and the dynamic boundary continues to move along the ride path. Hence, even though rider input makes the vehicle responsive to the rider, each vehicle is controlled to prevent a vehicle from catching up to a leading car (as the forward boundary of the dynamic boundary cannot be crossed) or from completely stopping (as the rear boundary of the dynamic boundary cannot be crossed by the vehicle). In this manner, the ride system is interactive and entertaining and, at the same time, adapted to minimize the risk of vehicles bumping into each other while concurrently increasing the overall ride capacity by limiting or setting the maximum travel time around the track or along the ride path.

Using dynamic boundaries for controlling vehicle progression allows several other vehicle control options. The rider (or controller) may provide input to change speeds to dodge or hit obstacles. In a free ranging vehicle (FRV), the rider may provide input to explore show spaces by moving more to the left or right or slowing to see more of a show/display or interact with gaining features. The vehicles may also be adapted to respond to off-board effects such as to be repositioned within the space defined by the dynamic boundary boundaries or to be accelerated or decelerated relative to the dynamic boundary travel rate along the ride path.

The controller (and its executed control program/module) may act to change the size and/or speed of the dynamic boundaries at different points along the ride path. The dynamic boundaries may be reduced in size (such as to moving points or to a space approximating the exterior size and shape of the vehicle itself) for vehicles entering or exiting a station. For a given dynamic boundary speed or travel rate, reducing the extent of the dynamic boundary may cause or be associated with an increase in the size of the protection spacing between dynamic boundaries. This allows vehicle spacing to be guaranteed in areas where tighter vehicle management is desirable such as at path crossings. Further, a ride designer may elect to change a size of the dynamic boundaries to guarantee vehicles arrive at a location at a specific time or to ensure vehicle spacing for proper engagement with show elements. For unconstrained vehicles (such as FRVs), dynamic boundaries can be extended in three dimensions to allow for lateral and vertical vehicle control by the rider and/or the controller within the dynamic boundary as well as control in the nominal direction of travel.

Several approaches may be used to implement the dynamic boundaries with a control program executed by a controller (e.g., a computer system used to control movements of vehicles in a ride system). In a first approach, the dynamic boundaries are software constructs defined and managed by a central control system. Based on the defined dynamic boundaries, accurate knowledge of the vehicle position, and rider inputs, the central control system manages movement of the vehicle within the dynamic boundary and along the ride path. This may involve directly controlling the vehicle or by adjusting permitted range of movements of the vehicle. In a second approach, much of the responsibility for control is moved to the vehicle such as with each being equipped with an onboard controller. In this approach, each dynamic boundary is implemented as an integral part of the vehicle motion profile. In a third approach, the dynamic boundary is defined based on the position of the vehicle ahead to provide an anti-collision system as the vehicles progress along a ride path. Implementing dynamic boundaries provides a relatively straight forward and inexpensive method for managing progress of vehicles in a ride system, especially one utilizing vehicles controlled by a smart system (e.g., a computer controlled motion with accurate position monitoring for each vehicle of the ride system).

The figures show how the concept of dynamic boundaries or vehicle motion envelopes may safely manage movement of a set of vehicles along a defined ride path of an amusement park ride. FIG. 1 is a schematic drawing of a portion of a ride or ride system 100 operating to manage passenger vehicle progression along a direction of travel using dynamic boundaries. In this relatively simple implementation, the ride 100 is shown to include three passenger vehicles 120, 122, 124 that are supported upon and limited to travel along an elongate track 110. The vehicles 120, 122, 124 may take numerous forms to practice the system 100 such as wheeled or bogied vehicles or watercraft with onboard or off board propulsion mechanisms that set the direction of travel 115 along the track 110 and the rate of travel or speed of each vehicle 120, 122, 124. The vehicles 120, 122, 124 may include input devices for allowing the rider(s) to provide input to affect the speed or other operation of the vehicles 120, 122, 124 along the track 110.

While not shown, an off board and/or onboard controller (or control system) is used in system 100 (as discussed below) to respond to the user input (or to control input from a ride program) to determine movements 121, 123, 125 of the vehicles 120, 122, 124 including the speed of the vehicles relative to the direction of travel 115 on the track 110. Particularly, each of the vehicles 120, 122, 124 is controlled by a controller that virtually positions or encases each of the vehicles 120, 122, 124 in a vehicle dynamic boundary 130, 134, 136, respectively, as shown in FIG. 1. During operation of the ride system 100, the control of vehicle progression along track 110 is managed such that the dynamic boundaries 130, 134, 136 do not overlap and such that the vehicles 122, 124, 126 must remain within the boundaries defined for a corresponding one of the dynamic boundaries 130, 134, 136.

In some embodiments of the ride system 100, the dynamic boundaries 130, 134, 136 may abut at adjacent ends or, as shown, a protection zone or dynamic boundary spacing 131, 135 with a length, $L_{PZ}$, is provided between a leading and trailing pair of dynamic boundaries 130, 134, 136 (e.g., a distance such as a few inches up to several feet). More typically, though, the stopping distance for a vehicle 120, 122, 124 at any point in a ride 100 (plus a cushion or safety factor) defines the protection zone length, $L_{PZ}$, and this defines a minimum dynamic boundary size (e.g., dynamic boundary length is length of the vehicle plus protection zone, $L_{PZ}$). Hence, the protection zone, 131, 135 in some cases (such as where dynamic boundaries abut each other) may be considered a part of the dynamic boundary (e.g., zone 131 is in dynamic boundary 130 and zone 135 is in dynamic boundary 134).

A nominal vehicle spacing, $L_{NVS}$, may be defined for a ride system 100 by combining a dynamic boundary length, $L_{CB}$, with the length, $L_{PZ}$, of the protection zone, 131, 135. Again, this may be set for the entire ride along the track 110 or it may vary at differing points or locations along the track 110, e.g., allow larger (i.e., longer in the ride 100 example) dynamic boundaries in some portions of the ride such as thrill sections and smaller dynamic boundaries in other portions such as in show portions or in the station to facilitate loading and unloading of the vehicles. The nominal vehicle spacing length, $L_{NVS}$, is measured from trailing or second end 141 of a dynamic boundary 130 (trailing dynamic boundary in the pair) to a trailing or second end 142 of the adjacent (or leading) dynamic boundary 134. In contrast, the dynamic boundary length, $L_{CB}$, is measured from a first or leading edge/end 144 of a dynamic boundary 134 to a second or trailing edge/end 142 as shown in FIG. 1. In some embodiments, the width, $W_{CB}$, of the dynamic boundary 134 may be varied along the track 110 or ride path, but in the ride system 100 where the vehicles 120, 122, 124 are bound to the track 110, the width, $W_{CB}$, remains constant (e.g., is about the width of a vehicle) as the vehicles only travel along the direction of travel 115 (i.e., in the X direction) and not transverse to the direction of travel 115 (i.e., in the Y direction) as is the case with many embodiments of the invention.

According to a unique aspect of ride system 100, the dynamic boundaries 130, 134, 136 are used by a controller of the system 100 to control locations and movements (e.g., progression) of the vehicles 120, 122, 124 along the ride path associated with the track 110. More particularly, the ride system 100 is operated or controlled such that the dynamic boundaries 130, 134, 136 along with the protection zones 131, 135 progress along the ride path in the direction of travel at a managed rate (which may be constant or be varied along the ride path by a controller). The vehicles 120, 122, 124, in contrast, can speed up or slow down (as indicated with arrows 121, 123, 125) as the dynamic boundaries 130, 134, 136 move at the dynamic boundary travel rate along the ride path of the track 110. In this way, the vehicles 120, 122, 124 may occupy any position within their assigned or corresponding dynamic boundary 130, 134, 136.

FIG. 1 may be thought of as showing all the vehicles 120, 122, 124 in a default vehicle position at the rear of the dynamic boundary (e.g., against or proximate to a trailing edge 141, 142 of the dynamic boundary such as dynamic boundaries 130, 134). The vehicle 120, 122, 124 then is controlled by a controller of the ride system 100 to force it to travel in the direction of travel 115 at a rate matching that of the dynamic boundary 130, 134, 136 along the ride path (e.g., forced to remain within the boundaries of the dynamic boundary which is itself moving). The "default" position, though, may be any other position within the dynamic boundary 130, 134, 136.

Further, FIG. 1 is useful for showing that when a vehicle is at a rearmost location it is controlled such that it cannot further slow down and any input to that effect such as braking would be ignored or overruled by the controller (or its software programs). If no input is received from the rider, the vehicle 120, 122, 124 is moved along with its progressing/moving dynamic boundary. If the rider provides input to accelerate to a speed faster than the dynamic boundary's speed or progress rate along the direction of travel 115, the vehicle 120, 122, 124 may move, as shown with arrows 121, 123, 125, forward within the dynamic boundary 130, 134, 136 toward the first or leading edge or boundary of such dynamic boundary 130, 134, 136.

Figure 2:
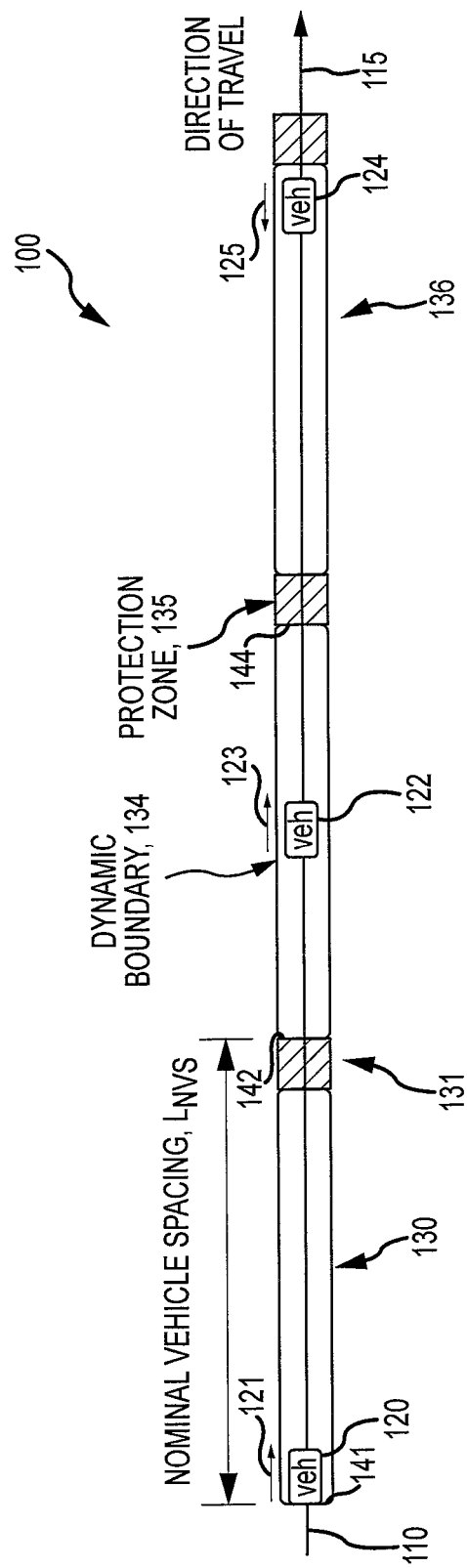
FIG. 2 shows the ride or ride system of FIG. 1 at a second time in which vehicles have been moved within the dynamic boundaries (which themselves are moving at some rate(s) of speed in the direction of travel)

This freedom of inner dynamic boundary space movement is shown in FIG. 2. The vehicle 120 may be operated by its rider to brake or may be operated with no rider input. Such braking results in the vehicle 120 moving 121 in the direction of travel 115 along the ride path defined by track 110 at the rate or speed of the dynamic boundary 130. The vehicle 122 is being operated by a rider to accelerate or move faster than its containing dynamic boundary 134 to move as shown with arrow 123 away from the second or trailing edge/boundary 142 toward the first or leading edge/boundary. The vehicle 124 is being operated differently, being operated based on rider input (such as braking or releasing the accelerator) to travel at a rate slower than the dynamic boundary or even negative at a speed or rate opposite the direction of travel 115 as shown with arrow 125 indicating the vehicle 124 is moving within its dynamic boundary 136 toward the trailing dynamic boundary 134 and its contained/restrained vehicle 122. The vehicle speed may range widely and even include negative speeds in the sense the vehicle is not moving in the direction of travel along the ride path. The vehicle, though, must stay within its dynamic boundary such that the controller forces the vehicle to move at the dynamic boundary travel rate when the vehicle is at the rear most location within the dynamic boundary and when the vehicle is at the forward most location within the dynamic boundary.

Figure 3:
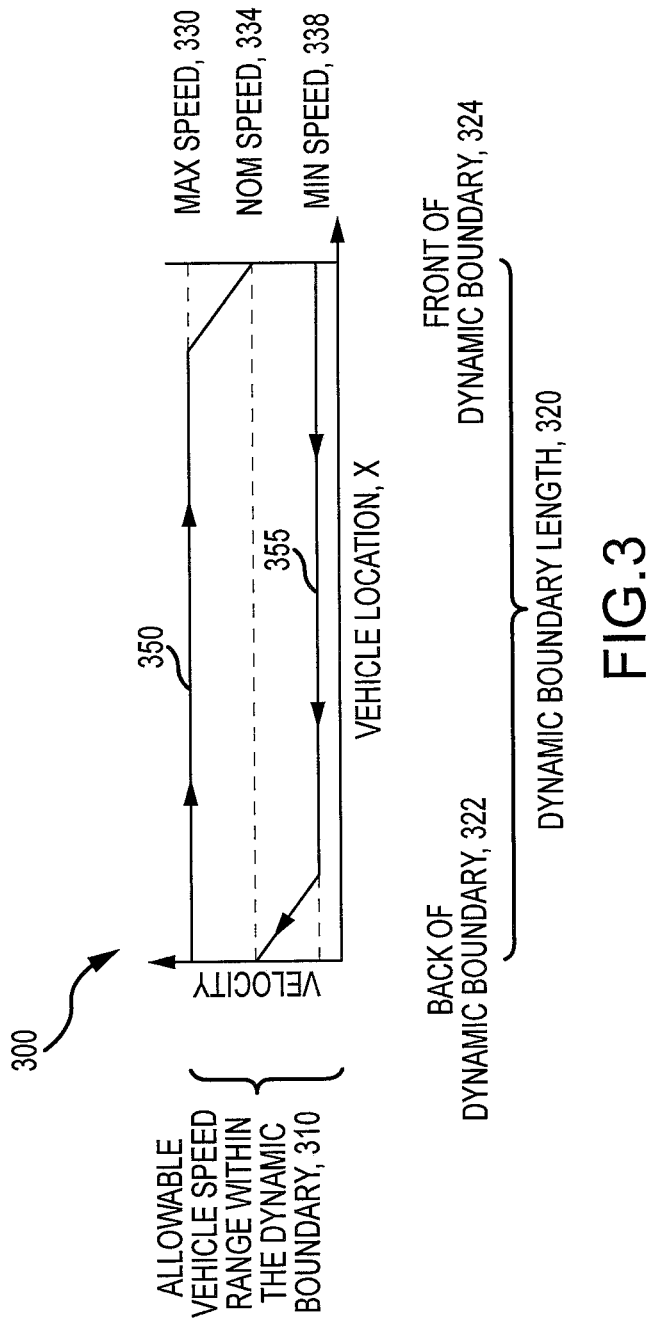
FIG. 3 provides a graph illustrating an allowable vehicle speed range within a dynamic boundary of FIGS. 1 and 2.

FIG. 3 provides a graph 300 showing the range of allowable vehicle speeds within a dynamic boundary. The graph 300 includes a Y-axis indicating increasing vehicle velocities and an X-axis indicating movement of the vehicle along the direction of travel of the ride path. On the X-axis, the dynamic boundary length, 320 is demarcated between an X-location associated with the rear or back boundary of the dynamic boundary at 322 and an X-location associated with the front boundary of the dynamic boundary at 324. The designations "front" and "back" are provided to assist discussion and understanding as the dynamic boundaries can be designated sides, top, bottom, or other reference designation. On the Y-axis, the range of allowable vehicle speeds 310 is shown between a maximum speed 330 and a minimum speed 338, with the nominal speed 334 between these two limiting values.

The line 350 shows that a vehicle at the back or rear edge 322 of the dynamic boundary may travel at any speed in the range 310 up to the maximum value 330 until the controller determines the vehicle is approaching the front or leading edge 324 at which point the controller governs the speed of the vehicle down to the nominal vehicle speed 334 (i.e., the speed of the dynamic boundary in which the vehicle is constrained). The graph 300 also shows with line 355 that a vehicle starting at the front or leading edge 324 may travel at any rate in the range 310 down to the minimum speed 338 until the controller determines the vehicle is at or quickly approaching the second or trailing edge 322 of the dynamic boundary. At this point, the controller governs the vehicle's propulsion mechanism to speed up to at least the nominal speed 334 to remain within the dynamic boundary by traveling at least as fast as the dynamic boundary along the ride path in the direction of travel of the dynamic boundary.

One technique for defining a dynamic boundary size for managing progression of vehicles in the ride 100 of FIGS. 1 and 2 involves determining that it is desirable to have a ride throughput capacity of 1000 riders or passengers per hour for a ride with vehicles that have capacities of 4 passengers per vehicle. This may lead to a determination that the nominal vehicle speed (and dynamic boundary speed) should be 6 feet per second along the ride path. Other known parameters may include a vehicle length of 8 feet, a braking deceleration rate of 8 feet per second squared and a response time of 0.25 seconds for control signals. With this information, a dispatch interval of 14.4 seconds, a nominal spacing of 86.4 feet, and a stopping distance of 3.75 feet all can be determined, and the calculated or predefined dynamic boundary length may be set at 74.65 feet for a ride with these design and/or operating parameters. If these parameters are changed, the dynamic boundary length probably will also change. The dynamic boundary length is often not kept at a fixed value through the length of the ride path (or track) and may be varied to achieve particular control goals or needs.

FIGS. 4A and 4B illustrate a portion of a ride configured to control vehicle progression within dynamic boundaries or envelopes. FIG. 4A shows dynamic boundaries 410, 412, 414, 420 moving as shown with arrow 440 at a speed or progression rate in a direction of travel. FIG. 4A shows the chain or train of dynamic boundaries 410, 412, 414, 420 at a first time, "T." As the dynamic boundary progression 440 occurs, a vehicle 430 is contained in the dynamic boundary 420 (and other vehicles are in dynamic boundaries 410, 412, 414). The dynamic boundary 420, for example, defines a space or movement region within boundaries provided by trailing edge 422, leading edge 424, right (lower) edge 426, and left (upper) edge 428. The vehicle 430 may be controlled by a controller (not shown in FIG. 4) to respond to rider input via an input device on the vehicle 430 to move as shown with arrow 435 in two or more dimensions/directions (e.g., in the X and/or Y directions (e.g., sideways) or along/away from the direction of travel of the dynamic boundary 420 and/or transverse to the direction of travel of the dynamic boundary 420 along the ride path).

Often, the vehicle 430 may move at any speed within an acceptable range (as discussed with reference to FIG. 3) and in any direction until the location of the vehicle 430 would cause the vehicle 430 (or any portion of its exterior with or without a safety envelope placed around the vehicle) to contact a boundary edge/line 422, 424, 426, or 428. At this point, the controller typically would require the vehicle 430 to travel at the nominal speed in the direction of travel of the dynamic boundary 420 along the ride path (or even cause the vehicle to move back toward a more central location or a default location).

In FIG. 4B, the ride 400 is at a second, later time, "T+dT," in which the dynamic boundaries 410, 412, 414, 420 have progressed some distance along the ride path due to movement indicated by arrow 440 (e.g., dynamic boundaries move at the nominal speed as discussed with reference to FIG. 3 from the time shown in FIG. 4A to the time shown in FIG. 4B). As suggested by arrows 435, vehicle 430 moves within the dynamic boundary 420 such that it is in a second location relative to the boundaries of the dynamic boundary 420 that differs from the first location relative to the boundaries of the dynamic boundary 420 shown in FIG. 4A. Rider input may have been provided that cause the vehicle 430 to move a transverse direction and also to move rearward in the dynamic boundary 420 toward the trailing edge or boundary line 422 (e.g., to move slower than the nominal speed of dynamic boundary 420 in the elapsed time between the first and second times of FIGS. 4A and 4B).

Figure 5:
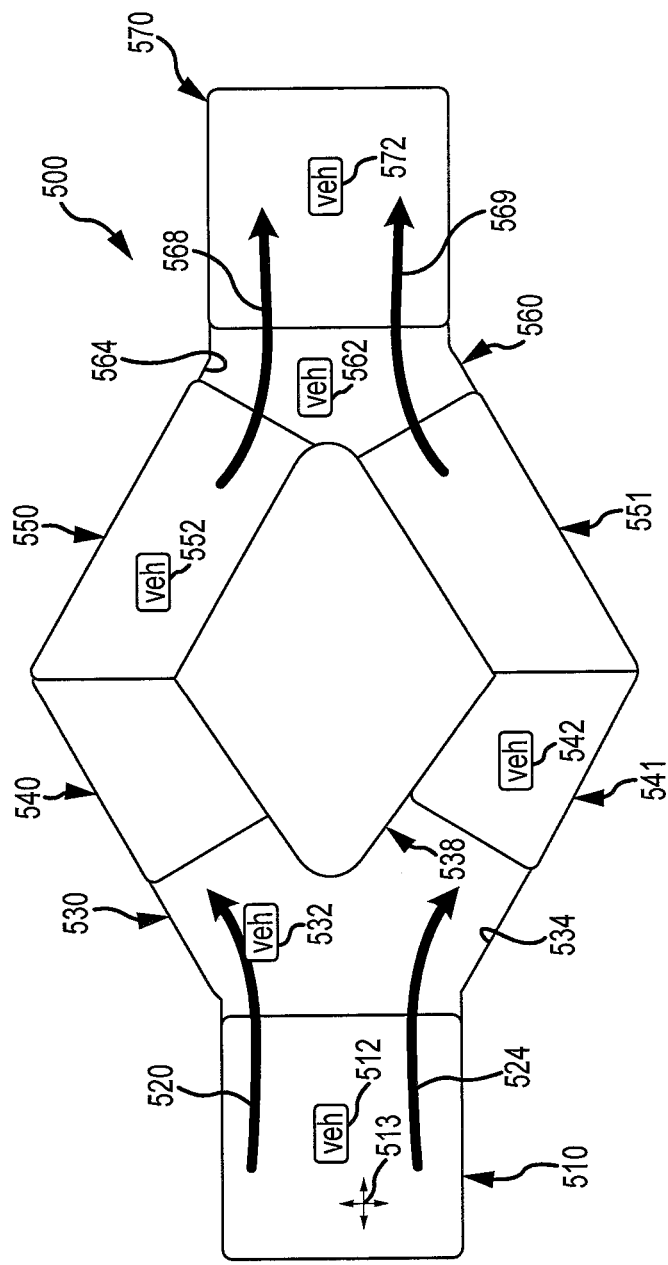
FIG. 5 illustrates a portion of a ride similar to that shown in FIGS. 1-4B but further showing a ride path with an obstacle and splitting of a dynamic boundary into two to provide two differing ride paths around the obstacle for boundary-constrained vehicles.

FIG. 5 illustrates a portion of a ride system 500 similar to those shown in FIGS. 1, 2, 4A, and 4B but that is designed to include an obstacle 538 in the ride path. The ride 500 is controlled such that a vehicle 512 is able to move in multiple directions as suggested by arrows 513. Movement of vehicle 512 may be based on rider input and/or be based on a control module/program, and these movements are constrained to be within the space defined by the boundaries (size and shape) of the dynamic boundary 510. The dynamic boundary 510 progresses along the ride path at the nominal speed defined for the particular portion of ride 500 and approaches the obstacle 538. As shown, a dynamic boundary 530 initially contacting the front edge/side of the obstacle 538 is configured to split with a first portion or defined space moving 520 along one side of the obstacle 538 as shown by arrow 520 and a second portion or defined space moving along a second or opposite side of the obstacle 538 as indicated by arrow 524. A vehicle 532 in the dynamic boundary 530 may move based on rider input (or control program input such as random selection or every other vehicle) to follow one of the dynamic boundary progressions/paths 520 or 524 and will move into one of the splitting regions as it is restrained within the dynamic boundary boundaries 534.

As shown, the vehicle 542 leading the vehicle 532 has moved into the lower region such that it is in a lower one of the split dynamic boundaries 541 while the upper one of the split dynamic boundaries 540 is empty (contains no vehicle, contains another vehicle that has its dynamic boundary dynamically increased in size to take advantage of the available space, or may not exist in some control applications). The vehicle 552 leading the vehicle 542 took the upper passage and is in an upper one of a pair of split dynamic boundaries 550, 551 as it travels around the obstacle 538. The split dynamic boundaries 540, 541, 550, 551 may be any size and shape and do not need to be the same as upstream dynamic boundaries 510 to suit the obstacle or ride designer's needs. Downstream of the obstacle 538, pairs of split dynamic boundaries 550 and 551 may join to form a single dynamic boundary 560 as indicated by boundary flow or progression paths 568, 569, and shown to contain vehicle 562. The vehicles enter a downstream dynamic boundary as shown for vehicle 572 in dynamic boundary 570 that may have the shape and size of the upstream dynamic boundary 510 as shown or be of a different shape and size. FIG. 5 shows that the dynamic boundaries used to control vehicles may split and merge around one or more branching elements (such as obstruction 538) and also that the dynamic boundaries may be varied in size and shape along the ride path, which will further limit vehicle movement or further free the vehicle for more movement.

Figure 6:
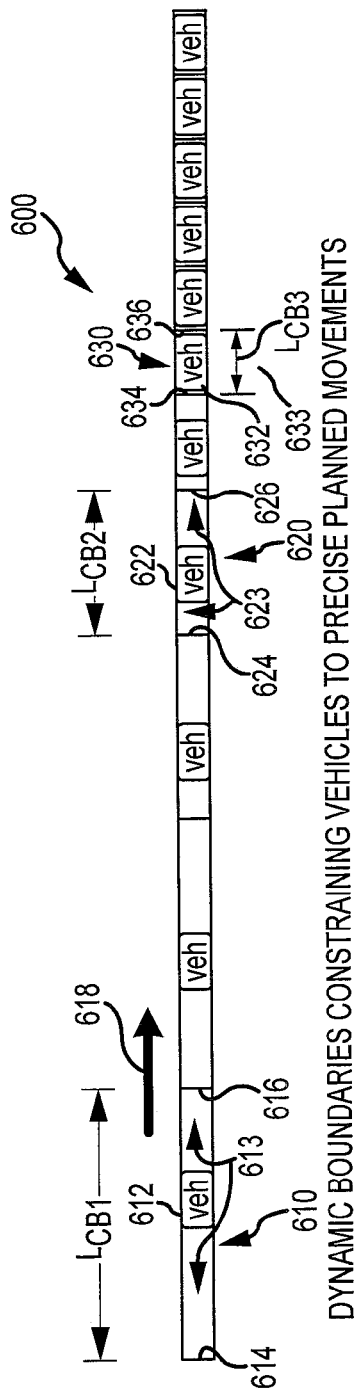
FIG. 6 illustrates a portion of a ride similar to those found in FIGS. 1-5 or a length of a ride path of such a ride that is operated by a controller (not shown) to reduce the size (e.g., length) of dynamic boundaries along the direction of travel (or over operating time) to further constrain the vehicles to a set of precise, planned movements (e.g., to limit or even eliminate freedom of movement of the vehicle such as for use near a show element or in a station)

FIG. 6 illustrates a portion of a ride system 600 illustrating dynamic boundaries of changing size and shape to constrain vehicles to provide precise planned movements (i.e., to reduce or even eliminate freedom of movement based on rider input by collapsing the dynamic boundary boundaries down to about the size of the vehicle). As shown, the ride 600 includes a first set of dynamic boundaries such as dynamic boundary 610 with a first relatively long length, $L_{CB1}$, and the vehicle 612 is free to move in either direction into boundary portions 613 within the dynamic boundary 610 between the ends 614, 616 defining the length, $L_{CB1}$. The vehicle 612 may be 6 to 10 feet in length and the dynamic boundary length, $L_{CB1}$ may be 20 to 50 feet providing significant freedom of movement for the vehicle 612 within the dynamic boundary 610 as it progresses along the ride path as indicated by arrow 618.

As the vehicles approach a portion of the ride 600 where tighter control over vehicle movement is desired, a smaller or collapsed dynamic boundary 620 is used to constrain vehicle 622 and its movements within boundaries 624, 626. The smaller dynamic boundary 620 at a second location in the ride 600 has a second dynamic boundary length, $L_{CB2}$, that is less than $L_{CB1}$ to reduce movement as shown with arrow 623 of vehicle 622, e.g., in the above example, the length may be shrunk from 40 to 50 feet to 20 to 30 feet or the like. Then, when even tighter control is desired, a dynamic boundary 630 may further constrain a vehicle 632 such that its movement as shown with arrow 633 between ends 634, 636 is tightly limited (i.e., the third dynamic boundary length, $L_{CB3}$, is only a small amount larger than the vehicle length) or nonexistent (i.e., the third dynamic boundary length, $L_{CB3}$, is the same as or substantially the same as the length of the vehicle). In this manner, dynamic boundaries that vary in size and shape over the length of the ride path can readily provide significant amounts of movement or freedom within the dynamic boundary or provide much smaller or no freedom of vehicle movement such that the vehicle progresses with the vehicles dynamic boundary (i.e., the nominal speed of the ride or the dynamic boundary velocity or progression rate) along the ride path.

Figure 7:
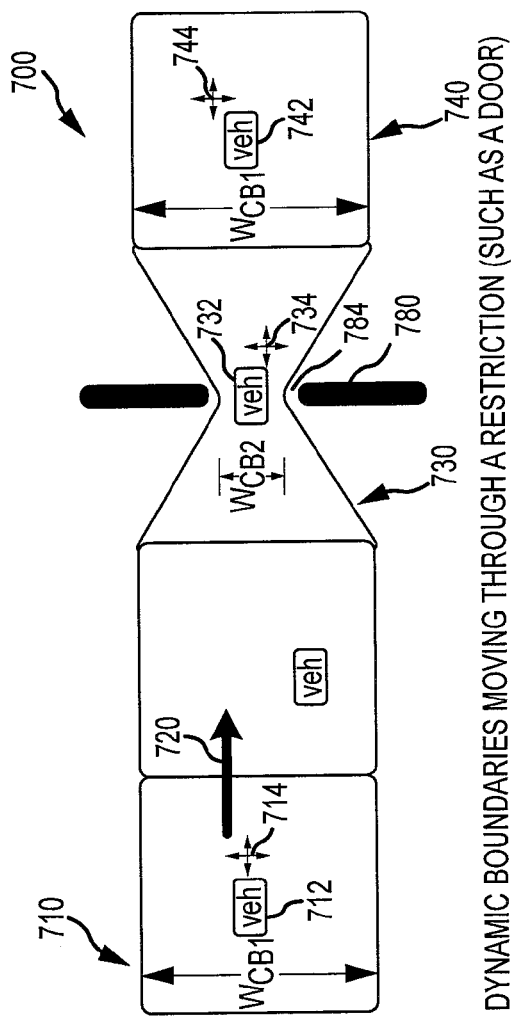
FIG. 7 illustrates a portion of a ride similar to that shown in FIGS. 1-6 that is operated by a controller to change the definition of a dynamic boundary along the length of the track or ride path to force a vehicle to travel through a restriction such as a door or gate (e.g., reduce the width of the dynamic boundary to reduce travel transverse to the direction of travel at the restriction or opening in an obstruction)

FIG. 7 illustrates yet another portion of a ride system 700 similar to those of FIGS. 1, 2, and 4A-6 that is adapted to show dynamic boundaries may force a vehicle to travel through a restriction in the ride path such as to pass through a gate, door, or hole in a wall (or other feature). As shown, the ride system 700 includes a wall or other obstruction 780 with a hole or opening 784. The ride system 700 is configured to first control progression of a vehicle 712 with a dynamic boundary 710 with a width, $W_{CB1}$, that is much greater than the width of the hole/opening 784 in the obstruction or feature 780 such that the vehicle 712 has significant range of movement transverse to the direction of travel (and in the direction of such travel). The dynamic boundary 710 is moved at a nominal speed as shown with arrow 720 toward the obstruction or feature 780 where if nothing was changed in the control method the vehicle 712 could collide with the obstruction 780.

Instead, the control within the ride system 700 acts to provide a dynamic boundary 730 at the location of the obstruction 780 that necks down in width to a second width, $W_{CB2}$, at the location of the obstruction 780. The width, $W_{CB2}$, may be the same as or some amount less than the width of the opening 784 and be at the location of the opening 784 such that the dynamic boundary 730 has a boundary that passes through the opening 784 and does not include the obstruction 780. In this manner, the vehicle 732 may move as shown with arrow 734 in any direction including transverse to the direction of travel in the dynamic boundary 730 except its movement is directed through the hole 784, e.g., the transverse movement is restricted when the vehicle 732 is determined by the dimensions and shape of the boundary of the dynamic boundary 730 to be approaching and then passing through the hole 784.

Figure 8:
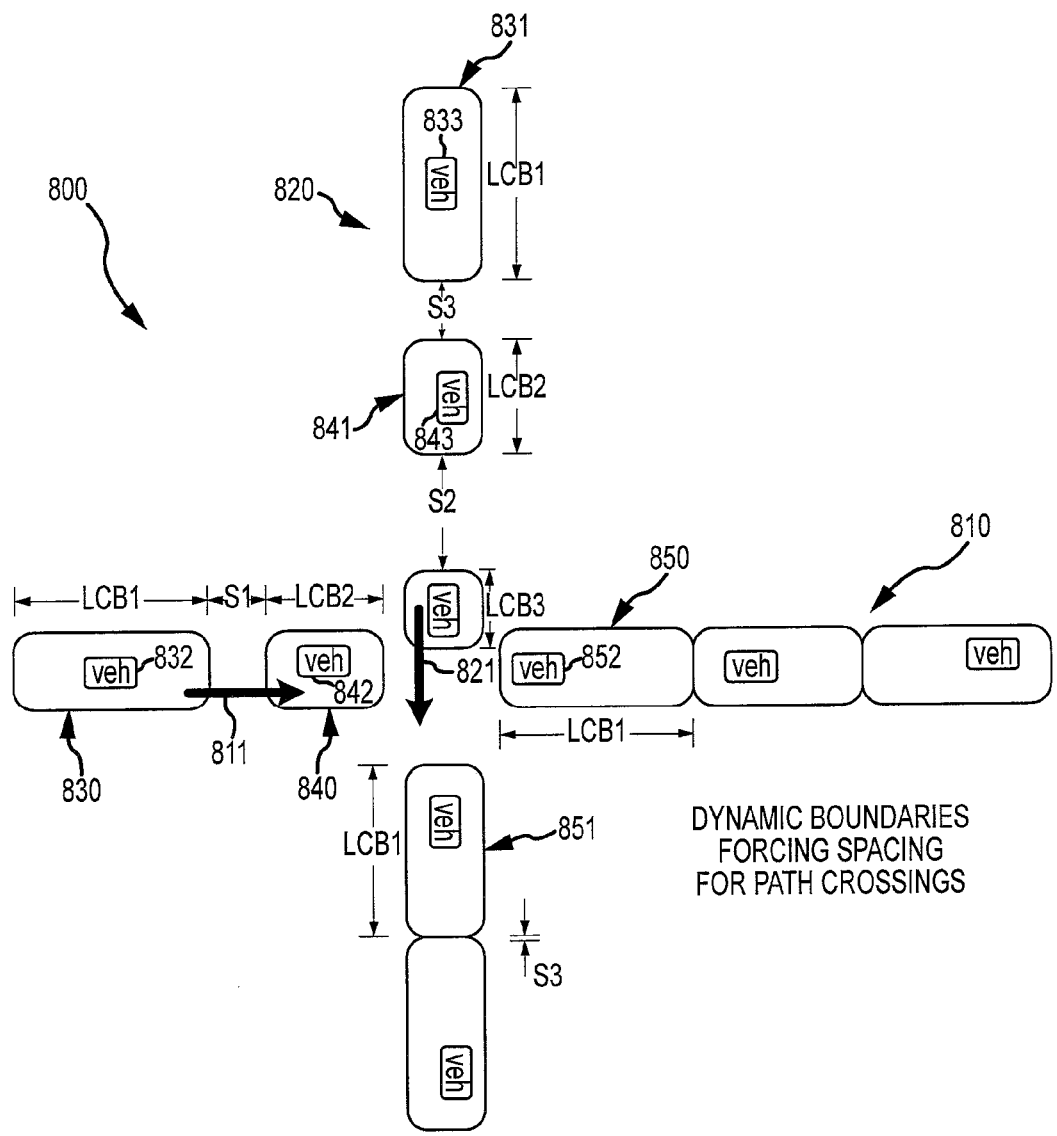
FIG. 8 shows a portion of a ride similar to that shown in FIGS. 1-7 with a path crossing and use of dynamic boundaries to safely manage progress of vehicles through the crossover point or intersection of the track/ride path.

FIG. 8 illustrates a ride portion 800 configured to provide control of vehicles when the ride path has an intersection/crossing. This can be achieved using dynamic boundaries that are configured to force spacing of the vehicles for path crossings. As shown, the ride portion 800 includes a first set 810 of dynamic boundaries each containing a vehicle and a second set 820 of dynamic boundaries each containing a vehicle, and the two sets 810, 820 have crossing ride paths. The controller (not shown) of ride portion 800 is adapted to use dynamic boundaries 830, 831 approaching the crossing/intersection to constrain vehicles 832, 833 within a first, relatively large length, $L_{CB1}$.

These first dynamic boundaries 830, 831 in each set 810, 820 progress in the directions indicated by arrows 811, 821 toward the crossing and are spaced apart by a first spacing, $S_1$, from a next dynamic boundary 840, 841 used to constrain movement of vehicles 842, 843. This first spacing is relatively small as the distance is provided in dynamic boundaries 830, 831. The length of the dynamic boundaries shrinks, though, as seen for the length, $L_{CB2}$, of the second pair of dynamic boundaries 840, 841 approaching the intersection of the two ride paths. This shrinking allows a larger spacing, $S_2$, between a dynamic boundary with an even smaller length, $L_{CB3}$, passing as shown with arrow 821 through the crossing/intersection. Once the dynamic boundaries 850, 851 pass through the intersection/crossing, they may be returned to or stretched back to the first (or second or another) length, $L_{CB1}$, that is longer that the crossing length, $L_{CB3}$, and the spacing may be returned to the first spacing or shrunk further as shown at $S_3$ (provided to the dynamic boundaries 850, 851 movement of vehicles such as vehicle 852 in dynamic boundary 850). Hence, the control method may be thought of as reducing lengths of dynamic boundaries near an intersection to limit vehicle movement into dynamic boundary spacing between adjacent dynamic boundaries to eliminate the risk of a collision at a path crossing.

Figure 9:
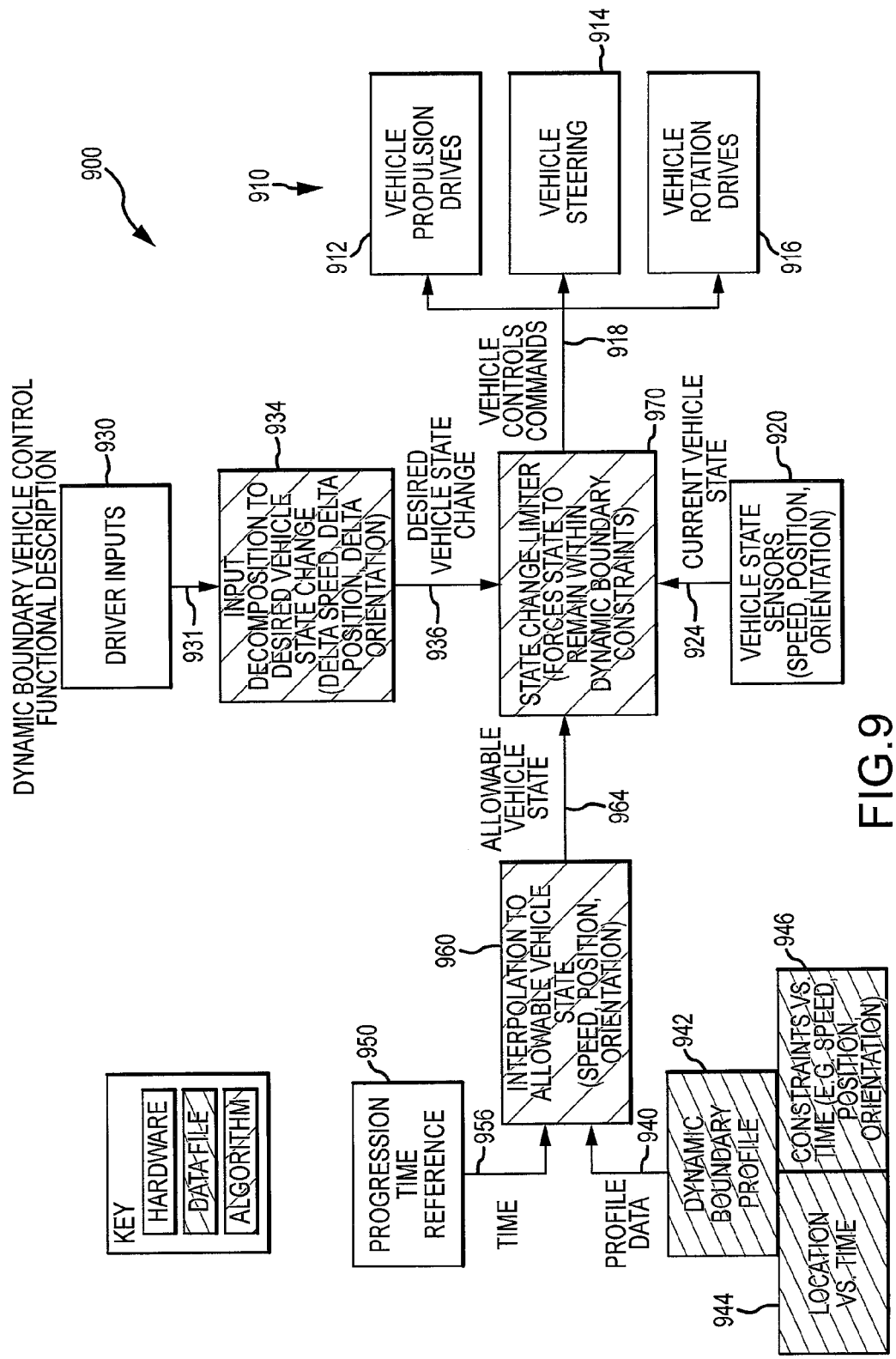
FIG. 9 illustrates a functional block diagram of a ride or ride system adapted for and operating to provide dynamic boundary-based control over vehicle progression along a ride path.

FIG. 9 illustrates a functional block diagram of a ride system 900 according to the present description. The ride system 900 is adapted for utilizing the logical construct of dynamic boundaries for managing progression of passenger vehicles, adapted for rider input on movement, through a ride (along a ride path). The system 900 is shown to include the hardware, data files, and software/algorithms that may perform the functions described herein, and each of these components is identified as shown by the key of FIG. 9.

It will be understood that the hardware and algorithm items may be implemented with any combination of hardware, firmware, and software (e.g., a hardware item may include software or be replaced by software or vice versa). Also, one or more computers or computing devices configured for the special purpose of providing these functions may execute the software or algorithms (code or instructions executable by the computers/computing devices) to provide the "controllers" of the present description. Still further, although not shown, the data files will be saved in non-transitory medium or data storage (as would be the executable code) at least periodically and would be communicated among the hardware and software components in a wired or wireless manner (as is known or as developed after the writing of this description).

The ride system 900 controls a plurality of passenger vehicles that travel along a ride path. With this in mind, components of a single vehicle are shown for illustration, and these components would be provided in each vehicle. Particularly, in the system 900 each passenger vehicle would include a vehicle drive (or motion) assembly 910 that includes one or more vehicle propulsion drives 912 (to set the velocity or speed of the vehicle along the ride path), a vehicle steering assembly 914 (to control the direction of travel of the vehicle relative to the ride path such as along the path or transverse to such a path in some applications such as a FRV ride), and one or more vehicle rotation drives 916 (to allow the vehicle body to spin or rotate about an axis to orient the front of the vehicle relative to the ride path or direction of travel). During operation of the ride system 900, the controller or control components (such as a state change limiter module 970) may act to transmit or communicate vehicle control commands 918 to the vehicle drive/motion assembly 910 to manage progression and operation of the vehicle as it moves within a dynamic boundary, which is progressing at a nominal or settable rate along a ride path.

The vehicle may also include driver input(s) 930 such as received via operation of a steering wheel, joystick, a touchscreen, accelerator pedal, brake pedal, and the like. These may be operated by a rider or passenger of the vehicle to control or affect movement of their vehicle along the ride path, and the ride system 900 is configured to communicate these (or a portion of these) inputs as shown at 931 to a portion of the controller. Particularly, software module 934 is provided that is executed to decompose or process the received driver inputs 931 to determine the rider's desired change for the vehicle's operating state.

The driver may press the accelerator or the brake, and the module 934 may act to determine a delta speed value (e.g., increase or decrease vehicle speed by an amount). In other cases, the driver inputs 930 may be used by the rider to change the position of the vehicle within the dynamic boundary such as by turning a steering wheel or moving a joystick to the left or right, and the module 934 may determine a delta position value (e.g., move to the left or right relative to the present direction of travel in the dynamic boundary). In other cases, the driver inputs 930 may include input to rotate the vehicle to change its orientation, and the module 934 may act to determine a delta orientation value (spin clockwise or counterclockwise). The result may include the module 934 acting to transmit a desired vehicle state change 936 to the state change limiter 970 for a determination whether such change in state is allowable, and, if so, transmitting a vehicle control command 918 to the appropriate component of the drive assembly 910 (e.g., to the vehicle propulsion drive 912 when the state change requested is to accelerate or decelerate).

Module 970 is configured to process the desired vehicle state change 936 to insure that the vehicle remains within the dynamic boundary constraints (e.g., cannot go slower than the dynamic boundary's nominal speed when at the trailing or second boundary of the dynamic boundary). To make this determination, the state change limiter 970 takes a current vehicle state 924 as input from one or more vehicle state sensors 920. The sensors 920 may be onboard and/or off board the vehicle and may collect data, which may be stored at least temporally in memory, including a present vehicle speed (and direction of movement), a position of the vehicle (e.g., which can determine the relative position of the vehicle to the present boundaries of the dynamic boundary and their locations as the dynamic boundary moves along the ride path), and a vehicle orientation (e.g., which can determine the direction the rider wants vehicle to move in dynamic boundary).

The limiter 970 also takes an allowable vehicle state 964 as input. The limiter 970 acts to compare the current vehicle state 924 with the allowable vehicle state 964 to determine whether the desired vehicle state change 936 can be implemented or used to affect the vehicle state to remain within the dynamic boundary constraints. The results are vehicle control commands 918 provided to the vehicle drive assembly 910, e.g., force vehicle to be steered in a first direction to follow a ride path and remain in dynamic boundary rather than implementing state change 936 that would have moved vehicle out of the dynamic boundary or slow vehicle down to a speed slower than the dynamic boundary's nominal speed causing the vehicle to move toward the rear boundary or the like.

The allowable vehicle state 964 is generated by a software module 960 that functions to provide interpolation of profile data 940 to determine an allowable vehicle state, which may define the allowable range of vehicle speeds, the allowable vehicle positions, and the allowable vehicle orientation relative to the direction of travel along a ride path. The interpolation may be performed by the module 960 based on a present time 956 provided by a progression time reference 950, as the location and present state (size and shape) of each of the dynamic boundaries along a ride path may be determined based on a dispatch time, predefined nominal speed for the vehicles/dynamic boundaries, and present time 956. The profile data 940 may be set by data indicating a location for each dynamic boundary relative to time as shown at 944 and by data indicating the constraints for the vehicle relative to time as shown at 946 (e.g., the speed, position, and orientation of the vehicle within the dynamic boundary may be set based on time from dispatch rather than merely on the boundaries of the dynamic boundary and the vehicle's relative location to these boundaries). Further, the profile data 940 may include the dynamic boundary profile 942, which may also change based on the time (or position along the ride path) such as to have a shape and size at a first time while in the station, have a greater size after leaving the station, another profile to allow a vehicle to go around an obstruction, through an opening in an obstruction, to safely pass through a path crossing, and/or to force a vehicle to have a position relative to a show feature along the ride path.

Figure 10:
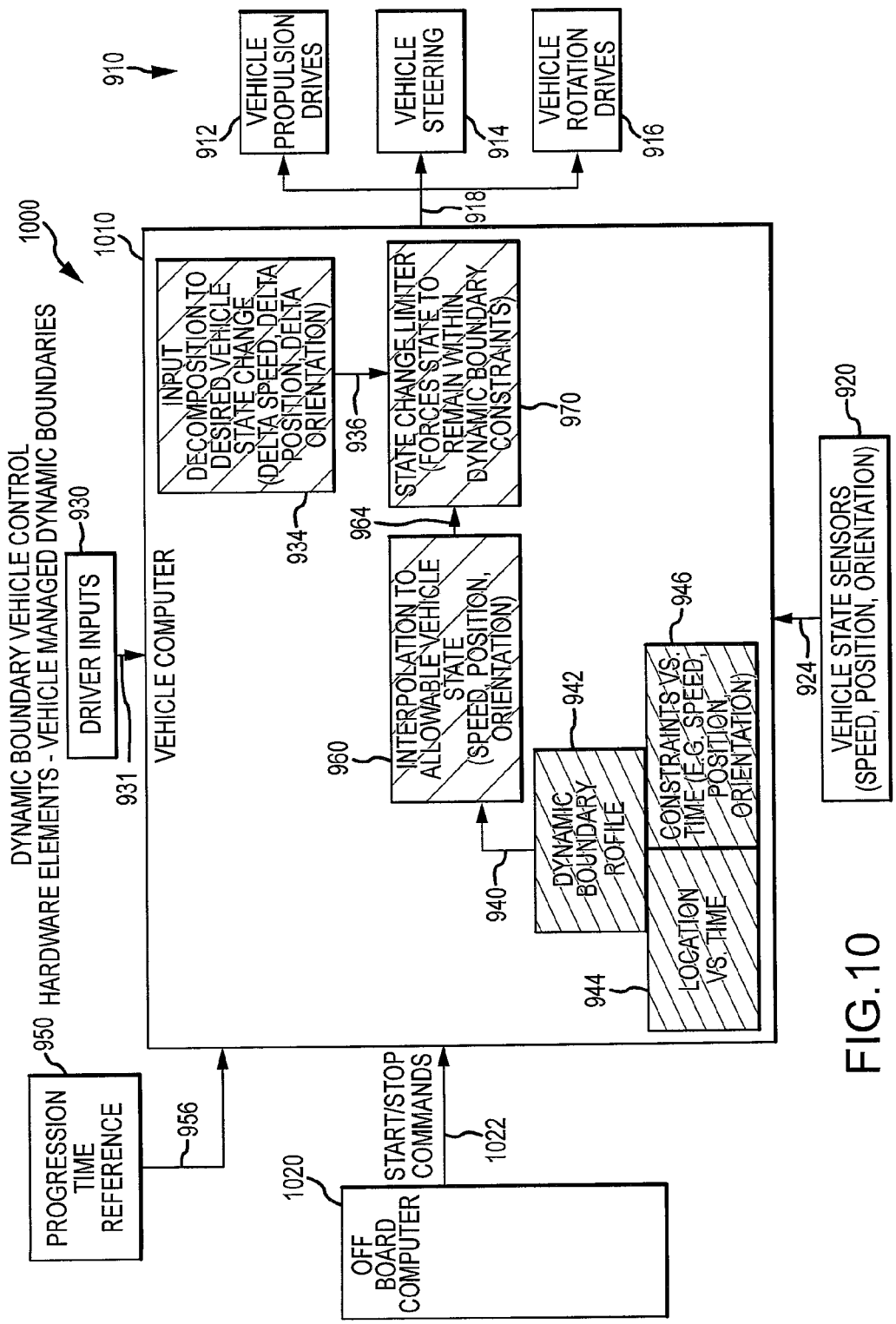
FIG. 10 illustrates a functional block diagram of a ride system with components/features of the diagram of FIG. 9 adapted for vehicle-based management of the vehicle progression using dynamic boundaries.

The controller or control methodology described using dynamic boundaries, and shown as it may be implemented in FIG. 9, may be implemented by managing progression within the vehicle or with an off board controller. FIG. 10 shows the system 900 as it may be implemented as a vehicle-managed dynamic boundaries system 1000. As shown, an off board computer or controller 1020 may provide start and stop commands 1022 to initiate and halt ride operations. A vehicle or onboard controller or computer 1010 is on the vehicle. The vehicle control commands 918 are generated by the onboard controller/vehicle computer 1010, which would be adapted to run the modules 934, 960, 970 and memory (or access to memory) storing the data files 942, 944, 946.

Figure 11:
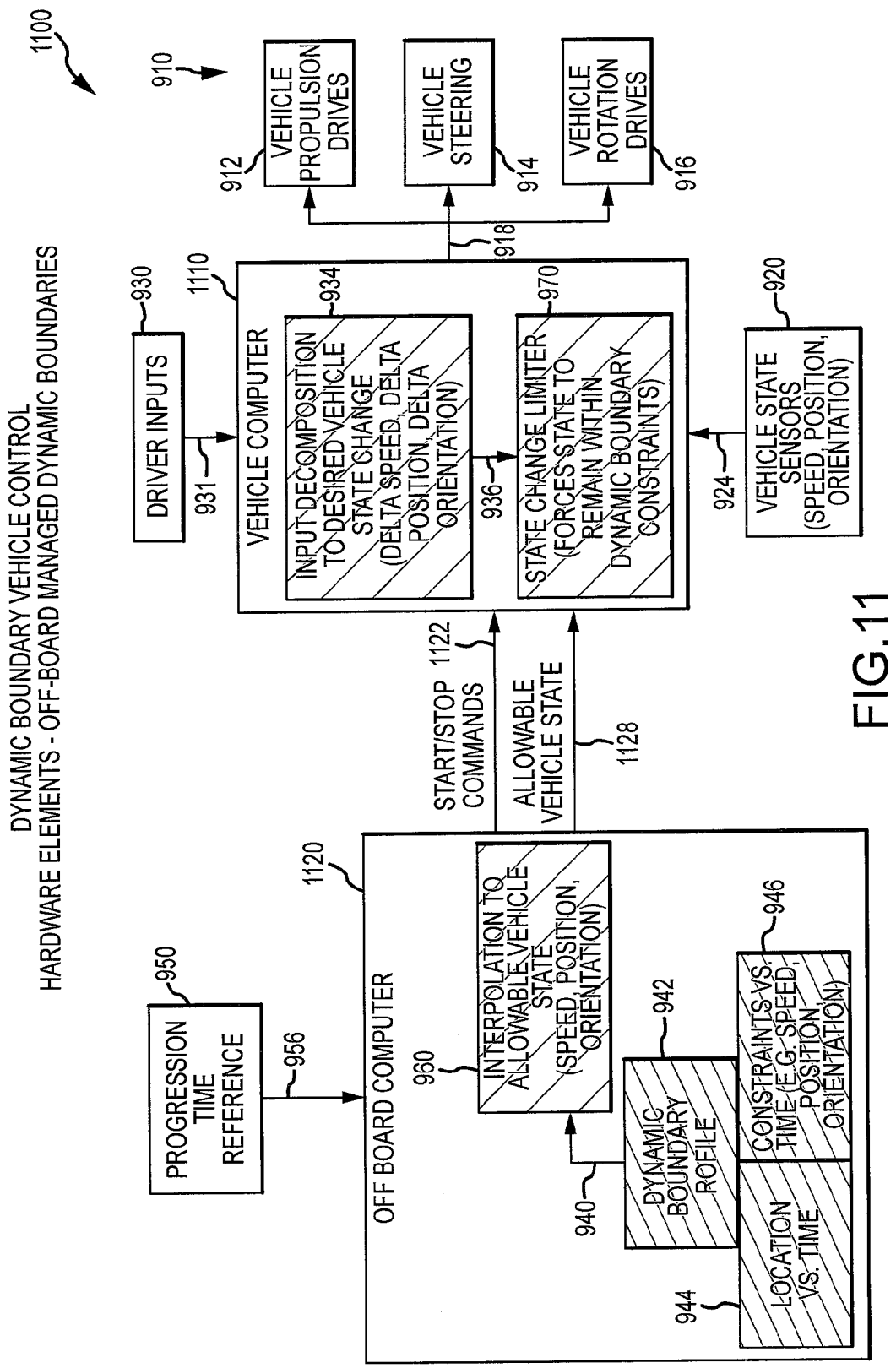
FIG. 11 illustrates a functional block diagram of a ride system with components/features of the diagram of FIG. 9 adapted for off-board (or off-vehicle) management of the vehicle progression through the ride using dynamic boundaries.

In other cases, though, it may be desirable to provide a central controller or off board managed dynamic boundaries, and the system 1100 implements the system 900 in this manner as shown in FIG. 11. In this system 1100, the vehicle computer/controller 1110 is adapted to run the rider input processing module 934 and the state change limiter module 970 to generate the control commands 918. However, the allowable vehicle state 1128 and start/stop commands 1122 are generated by an off board computer/controller 1120. The controller 1120 is configured to have the memory (or access to such memory) that stores the data files 942, 944, 946 and also to execute code or instructions for the module 960 to provide interpolation of this data and the reference time 956 to create the allowable vehicle state 1128.

Although the invention has been described and illustrated with a certain degree of particularity, the particular implementations described in the present disclosure has been as examples, and numerous changes in the combination and arrangement of parts can be resorted to by those skilled in the art without departing from the spirit and scope of the invention, as claimed. The dynamic boundaries shown were often isolated from each other, but it will readily be understood that other embodiments may include dynamic boundaries within dynamic boundaries. In this manner, a dynamic boundary may manage progress of a set of smaller dynamic boundaries and their corresponding vehicles. Further, the dynamic boundaries shown were often shown to include one passenger vehicle, but other embodiments may include two or more vehicles with vehicle collisions allowed or managed/controlled in other ways.

We claim:

1. A method of controlling vehicle progression along a ride path of an amusement park ride, comprising:
   receiving inputs from input devices operable by a passenger of a vehicle on the ride path;
   processing the received inputs to determine a vehicle state change;
   determining a present or predicted vehicle state;
   comparing the present or predicted vehicle state with a set of constraints defined by a dynamic boundary associated with the vehicle;
   based on the comparing step and the vehicle state change, issuing vehicle control commands to a drive assembly of the vehicle to implement the vehicle state change, whereby the vehicle complies with the set of constraints; and
   wherein the dynamic boundary splits at a first location along the ride path into first and second dynamic boundaries that merge into a single dynamic boundary at a second location along the ride path and wherein the vehicle state change is processed to select the first or second dynamic boundary for constraining progression of the vehicle along the ride path.

2. The method of claim 1, wherein the dynamic boundary moves along the ride path at a nominal speed during operating of the amusement park ride and wherein the dynamic boundary defines a set of boundaries for the vehicle.

3. The method of claim 2, wherein the vehicle state change comprises a change in the vehicle speed and wherein the issuing vehicle control commands causes the vehicle to travel at a speed differing from the nominal speed of the dynamic boundary.

4. The method of claim 3, wherein the speed of the vehicle is governed to force the vehicle to remain within the set of boundaries.

5. The method of claim 2, wherein the vehicle state change comprises a transverse movement relative to a direction of travel of the dynamic boundary along the ride path.

6. The method of claim 2, wherein the set of boundaries define a dynamic boundary length as measured between a leading end of the dynamic boundary and a trailing end of the dynamic boundary and wherein the length is greater than a length of the vehicle at least for portions of the ride path.

7. The method of claim 2, wherein the length of the dynamic boundary is modified from a first length in a first portion of the ride path to a second length greater than the first length during a second portion of the ride path.

8. The method of claim 2, wherein the set of boundaries define a dynamic boundary width and wherein the width is varied along the ride path, whereby an amount of transverse movement of the vehicle is controlled to direct the vehicle through openings in obstructions.

9. An amusement park ride, comprising:
   a ride path;
   a plurality of passenger vehicles each adapted with an input device operable by a passenger; and
   a controller comprising memory storing a profile for a dynamic boundary for each of the passenger vehicles and a processor executing code causing the processor to determine for each of the passenger vehicles an allowable vehicle state based on the control based on the dynamic boundary profile, to process inputs from the input device to determine a passenger-desired vehicle state change, and to issue vehicle control commands to control operation of the passenger vehicle by processing the passenger-desired vehicle state change to comply with the allowable vehicle state; and
   wherein the dynamic boundary splits at a first location along the ride path into first and second dynamic boundaries that merge into a single dynamic boundary at a second location along the ride path and wherein the vehicle state change is processed to select the first or second dynamic boundary for constraining progression of the vehicle along the ride path.

10. The system of claim 9, wherein the allowable vehicle state comprises a range of positions within a boundary defined by the dynamic boundary profile and the vehicle control commands are adapted to provide movement from a current position within the dynamic boundary to a new position within the boundary.

11. The system of claim 10, wherein the boundary defined by the dynamic boundary profile varies in size or shape along the ride path.

12. The system of claim 9, wherein the passenger-desired vehicle state change comprises a change in speed of the vehicle along the ride path and wherein the vehicle control commands affect control over a vehicle propulsion drive to cause a speed of the vehicle to be increased or decreased from a current speed while retaining the vehicle within a logical boundary for the passenger vehicle along the ride path.

13. The system of claim 12, wherein the dynamic boundary profile defines a range of allowable vehicle speeds for the passenger vehicle based on a current location of the passenger vehicle within the logical boundary and wherein the range of allowable vehicle speeds includes speeds greater than and less than a nominal speed for the dynamic boundary over the ride path.

14. A control method for managing vehicle movements, comprising:
   for each vehicle of a ride, providing a dynamic boundary defining a spatial boundary for movement of the vehicle relative to a ride path;
   during operation of the ride, determining a current speed of one of the vehicles;
   processing input from the vehicle to modify speed; and
   based on a current location of the vehicle within the dynamic boundary provided for the vehicle, controlling a propulsion drive for the vehicle to adjust the current speed while retaining the vehicle within the spatial boundary; and wherein the dynamic boundary splits at a first location along the ride path into first and second dynamic boundaries that merge into a single dynamic boundary at a second location along the ride path and wherein the vehicle state change is processed to select the first or second dynamic boundary for constraining progression of the vehicle along the ride path.

15. The method of claim 14, wherein the spatial boundaries defined for the dynamic boundaries are spaced apart along the ride path.

16. The method of claim 14, wherein the spatial boundary defined for each of the dynamic boundaries changes at least in width or in length along the ride path.

17. The method of claim 14, further comprising moving the dynamic boundaries along the ride path at a predefined nominal speed, whereby the spatial boundary for each of the vehicles moves over time along the ride path.

18. The method of claim 17, wherein the current speed is greater than or less than the nominal speed.

19. The method of claim 17, further comprising processing input from the vehicle to move transverse to a direction of travel of the dynamic boundary provided for the vehicle and controlling vehicle steering to move the vehicle transverse to the direction of travel while remaining within the spatial boundary of the dynamic boundary provided for the vehicle.

* * * * *